Patented Nov. 27, 1951

2,576,161

UNITED STATES PATENT OFFICE 2,576,161

PROCESS FOR REMOVING HALOGEN FROM A HALOPHENOL

Ralph B. Thompson, Hinsdale, Ill., assignor to Universal Oil Products Company, Chicago, Ill., a corporation of Delaware No Drawing. Application March 22, 1949, Serial No. 82,910

10 Claims. (Cl. 260—629)

This invention relates to a process for removing halogen from a halophenol and particularly for removing chlorine and bromine from monochlorophenols and monobromophenols.

An object of this invention is to convert a chlorophenol into a phenol.

Another object of this invention is to convert a bromophenol into a phenol.

A further object of this invention is to convert a butylchorophenol into a butyl phenol.

A still further object of this invention is to convert a tertiary butylchlorophenol into a tertiary butyl phenol.

An additional object of this invention is to convert 2-tert-butyl-4-chlorophenol into 2-tertiary-butylphenol.

In the production of alkyl phenols with particular structures such as 2,6-dialkylphenols, it is sometimes advantageous to substitute or block certain positions in the phenol ring with chlorine or bromine before carrying out an alkylation reaction in order to direct the alkylating group to the desired position or positions in the phenol ring. The resultant alkylated halophenol is then dehalogenated to the alkylated phenol. The present process is an improved method of converting such alkylated halophenols into the phenol having the desired carbon structure.

One specific embodiment of this invention relates to a process for removing halogen from a halophenol which comprises reacting said halophenol and a water-containing solution of a water-soluble alkaline sulfide.

Another embodiment of this invention relates to a process for removing halogen from a halophenol which comprises reacting said halophenol and an aqueous solution of an alkali metal sulfide.

A further embodiment of this invention relates to a process for removing chlorine from a chlorophenol which comprises reacting a chlorophenol and an aqueous solution of sodium sulfide.

A still further embodiment of this invention relates to a process for removing bromine from a bromophenol which comprises reacting said bromophenol and an aqueous solution of sodium sulfide.

The water-soluble alkaline sulfides which are utilizable as dehalogenating agents in this process comprise the water-soluble sulfides of a metal selected from the members of the group consisting of alkali metal sulfides and alkaline earth metal sulfides and including particularly sulfides of sodium, potassium, and calcium.

In this process the halophenol and a water-soluble alkaline sulfide, such as an alkali metal sulfide and particularly sodium sulfide in aqueous solution or in aqueous alcoholic solution, are heated at a temperature of from about 150° to about 350° C. and preferably at a temperature of from about 175° to about 275° C. for a time of from about two to about five hours. At the end of this treating time, the reaction mixture is cooled to room temperature and then acidified with sulfuric acid or with another suitable acid to liberate the phenol which is separated, for example, by extraction with an organic solvent, such as a mixture of diethylether and petroleum ether, and the solution of phenol in said organic solvent is then fractionally distilled, generally at a subatmospheric pressure, to obtain the phenol.

This process may be carried out using either batch or continuous types of treatment. In a batch-type operation, a halophenol and a molar excess of an aqueous or aqueous alcoholic solution of sodium sulfide are placed in a suitable reactor such as a steel autoclave and heated under pressure at a temperature in the above indicated range for a time sufficient to remove halogen from a substantial portion of the halophenol charged. The resultant reaction mixture is then removed from the autoclave and subjected to suitable separation treatment to remove the resultant dehalogenated phenolic material from unconverted halophenols, the latter being suitable for returning to further dehalogenation treatment.

This process for removing chlorine and bromine from chlorophenol and bromophenol may also be carried out in a continuous manner by charging the halophenol or a solution thereof in a suitable organic solvent to a reaction zone maintained at the desired temperature and to which an aqueous or aqueous alcoholic solution of an alkali metal sulfide or alkaline earth metal sulfide is charged continuously. The halophenol and aqueous alkali metal sulfide solution may be commingled before being charged to the heated reaction zone which may also contain baffles, packing material or be provided with other mixing devices for effecting intimate contact between the halophenol and aqueous or aqueous alcoholic solution of the sodium sulfide or other alkaline sulfide utilized as dehalogenating agent. From such a continuous type of operation, the resultant reaction products are directed to a suitable separating zone in which unconverted halophenol and unconverted alkali metal sulfide solution may be recovered for recycling to the process. The phenolic materials from which halogen has been removed are present in the resultant reaction mixture, generally in the form of the alkali metal phenolates from which the phenols are liberated by treatment with an aqueous solution of sulfuric acid or other suitable acidifying agent. The phenols so obtained which are substantially free from halogen atoms may then be recovered from the resultant reaction mixture by solvent extraction or other suitable means.

The following examples illustrate the results obtained in the operation of this process, but the data given herein should not be construed to limit unduly the broad scope of the invention.

*Example I*

2-bromo-4-sec-butylphenol and an aqueous solution containing a molar excess of sodium sulfide were placed in a steel autoclave which was then sealed and heated at a temperature of 200° C. for four hours. The resultant reaction mixture was cooled to room temperature, then acidified with a dilute aqueous solution of sulfuric acid and the resultant mixture of phenolic compound was extracted by means of a mixture of equal volumes of diethyl ether and petroleum ether. The extracted material was then fractionally distilled to remove the solvent and to separate 4-sec-butylphenol from unconverted 2-bromo-4-sec-butylphenol, the latter suitable for further treatment in the process to produce an additional quantity of 4-sec-butylphenol.

*Example II* p-Bromophenol (0.2 mole) was heated with sodium sulfide (60 grams of $Na_2S.9H_2O$) in 100 cc. of water at 200° C. for four hours under nitrogen pressure. The resulting product was acidified, extracted with ether-petroleum ether and the solution distilled at a pressure of 16 mm. of mercury. Ten grams of phenol was obtained, at 53% yield.

*Example III*

2-tert-butyl-4-chlorophenol (37 g.), $Na_2S.9H_2O$ (60 g.) and water (100 g.) were sealed in an autoclave and heated at 200° C. for four hours. The organic layer was separated and distilled in vacuo to give 13.5 g. of 2-tert-butylphenol boiling at 107–110° C. at 17 mm.

I claim as my invention:

1. A process for removing halogen from a halophenol which comprises heating said halophenol and a molar excess of a water-containing solution of a water-soluble alkaline sulfide at a temperature of from about 150° to about 350° C. for a time period of from about 2 to about 5 hours.

2. A process for removing halogen from a halophenol which comprises heating said halophenol and a molar excess of an aqueous solution of an alkali metal sulfide at a temperature of from about 150° to about 350° C. for a time period of from about 2 to about 5 hours.

3. A process for removing chlorine from a chlorophenol which comprises heating a chlorophenol with a molar excess of a water-containing solution of sodium sulfide at a temperature of from about 150° to about 350° C. for a time period of from about 2 to about 5 hours.

4. A process for removing bromine from a bromophenol which comprises heating said bromophenol with a molar excess of a water-containing solution of sodium sulfide at a temperature of from about 150° to about 350° C. for a time period of from about 2 to about 5 hours.

5. A process for removing chlorine from a butylchlorophenol which comprises heating a butylchlorophenol with a molar excess of a water-containing solution of sodium sulfide at a temperature of from about 150° to about 350° C. for a time period of from about 2 to about 5 hours and recovering the resultant butylphenol.

6. A process for removing chlorine from a tertiary butylchlorophenol which comprises heating a tertiary butyl chlorophenol with a molar excess of a water-containing solution of sodium sulfide at a temperature of from about 150° to about 350° C. for a time period of from about 2 to about 5 hours, and recovering the resultant tertiary butyl chlorophenol.

7. A process for removing chlorine from 2-tert-butyl-4-chlorophenol which comprises heating 2-tert-butyl-4-chlorophenol with a molar excess of a water-containing solution of sodium sulfide at a temperature of from about 150° to about 350° C. for a time period of from about 2 to about 5 hours, and recovering the resultant 2-tert-butyl phenol.

8. A process for removing bromine from 2-bromo-4-sec-butylphenol which comprises heating 2-bromo-4-sec-butylphenol with a molar excess of a water-containing solution of sodium sulfide at a temperature of from about 150° to about 350° C. for a time period of from about 2 to about 5 hours, and recovering the resultant 4-sec-butyl phenol.

9. A process for removing bromine from bromophenol which comprises heating said bromophenol with a molar excess of a water-containing solution of sodium sulfide at a temperature of from about 150° to about 350° C. for a time period of from about 2 to about 5 hours, and recovering the resultant phenol.

10. A process for removing chlorine from chlorophenol which comprises heating said chlorophenol with a molar excess of a water-containing solution of sodium sulfide at a temperature of from about 150° to about 350° C. for a time period of from about 2 to about 5 hours, and recovering the resultant phenol.

RALPH B. THOMPSON.

No references cited.